United States Patent [19]
Allirot et al.

[11] Patent Number: 6,025,987
[45] Date of Patent: Feb. 15, 2000

[54] MOUNTING ARRANGEMENT FOR MOUNTING A SUBSYSTEM UNIT

[75] Inventors: Richard Allirot, Corenc; Yves Bonfort, Herbeys, both of France

[73] Assignee: Hewlett-Packard Company, Palo Alto, Calif.

[21] Appl. No.: 08/932,155

[22] Filed: Sep. 17, 1997

[30] Foreign Application Priority Data

Mar. 10, 1996 [EP] European Pat. Off. ............. 96410104

[51] Int. Cl.⁷ .................................................. G06F 1/16
[52] U.S. Cl. ...................... 361/685; 361/753; 361/727
[58] Field of Search .................................. 361/685, 727, 361/725, 753, 799; 364/708.1; 312/223.2

[56] References Cited

U.S. PATENT DOCUMENTS

| | | |
|---|---|---|
| 4,688,131 | 8/1987 | Noda et al. . |
| 4,979,909 | 12/1990 | Andrews . |
| 5,262,923 | 11/1993 | Batta et al. ............................. 361/685 |
| 5,277,615 | 1/1994 | Hastings et al. ........................ 361/725 |
| 5,301,088 | 4/1994 | Liu . |
| 5,483,419 | 1/1996 | Kaczeus, Sr. et al. ................ 361/685 |
| 5,828,547 | 10/1998 | Francovich et al. .................... 361/685 |

FOREIGN PATENT DOCUMENTS

| | | |
|---|---|---|
| 4035124A1 | 11/1990 | Germany . |
| 1-237986 | 9/1989 | Japan . |

*Primary Examiner*—Donald Sparks
*Assistant Examiner*—John D. Reed

[57] ABSTRACT

To facilitate the user installation of a drive unit, such as a disc drive unit or CD-ROM unit, in a desktop computer, a mounting arrangement is provided that does not require the use of any tools. The mounting arrangement employs two side members provided with studs that engage in side fixing holes standardly provided in a drive unit. With the side members placed about the drive unit, the resultant assembly can then be slid into position in a support structure along guides that also serve to hold the side members against the drive unit. In a preferred embodiment, the side members take the form of a wall element made of a plastics material, and a U-shaped metal mounting element that clips over the wall element. On one side the mounting element has a projection that forms one of the side-member studs engaging in the fixing holes of the drive unit; on its other side, the mounting element has a resilient contact arm providing a grounding connection to the support structure.

10 Claims, 10 Drawing Sheets

MOUNTING ARRANGEMENT FOR MOUNTING A SUBSYSTEM UNIT

FIELD OF THE INVENTION

The present invention relates to a mounting arrangement for mounting a subsystem unit (for example, a mass-storage drive unit) in a piece of equipment such as a desktop computer.

BACKGROUND OF THE INVENTION

Floppy disc drive units and other mass-storage drive units have traditionally been mounted in desktop computers using fixing screws to secure the unit to a support structure. The fixing screws engage threaded apertures providing at standard positions in the sides of the drive unit. Such a mounting arrangement has a number of drawbacks particularly where a user is effecting installation of the drive unit; for example, the fixing screws are awkward to access and are easily dropped inside the computer housing.

FIG. 1 of the accompanying drawings shows a drive-unit mounting arrangement intended to overcome some of the drawbacks of the traditional mounting method. More particularly, FIG. 1 shows a 5.25 inch floppy disc drive unit 10 to which two side members 12 are attached by means of screws 13 that engage in threaded apertures 11 formed at standard positions in the sides of the unit 10. In FIG. 1, one side member is shown up against the unit 10 whilst the other is shown spaced from the unit for clarity of illustration. The side members 12 serve to guide sliding insertion of the unit 10 into a support structure of a computer, the support structure being provided with guide rails for the purpose. The side members 12 which are typically formed of plastics material, are each provided with a resilient snap-engagement member 15. The members 15 snap engage into a locking position against the support structure when the drive unit 10 is a fully inserted into the computer support structure. In addition, resilient metal contacts 14 are secured on the side members by means of the fixing screws 13 and provide grounding of the drive unit 10 to the support structure (the fixing screws 13 being of metal and providing an electrical connection between the contacts 14 and the casing of the disc drive 10).

In using the FIG. 1 arrangement, a user can secure the side members 12 to the drive unit 10 away from the computer itself, the resultant assembly then being slid into the support structure of the computer. The arrangement is clearly preferable to the traditional one where the screw fixing of the drive unit must be done in situ. Nevertheless, the FIG. 1 arrangement still suffers from the drawback that a user has to employ a screw driver to mount the drive unit.

Another example of a drive mounting arrangement using side mounting members screwed to the sides of a drive unit can be found in U.S. Pat. No. 5,301,088.

It is an object of the present invention to provide a simpler mounting arrangement for mass-storage drive units and similar subsystems.

SUMMARY OF THE INVENTION

According to the present invention, there is provided a mounting arrangement for mounting a subsystem unit provided with side fixing holes, the mounting arrangement comprising:

two side mounting members for engaging respective opposite sides of the subsystem unit, each side mounting member having studs that engage in corresponding ones of the side fixing holes when the side mounting members are placed in engagement with the subsystem unit, a support structure provided with guide means engaged by the side mounting members for guiding the insertion and withdrawal of the subsystem unit with the side mounting members engaged therewith.

With this arrangement, a user can easily install a new subsystem unit (for example, a new mass-storage drive) as this simply involves placing the side mounting members either side of the unit and then sliding the unit and side mounting members into the support structure, there being no need for tools to be used to effect these operations.

Where the subsystem unit has a front face intended to be user-accessible in use, then the mounting arrangement is preferably configured such that the unit can be slid into a fully-inserted position along a front-to-rear axis of the unit leaving the front face outermost; with such a configuration, it is not even necessary to remove any casing surrounding the support structure in order to install the unit.

The side mounting members can be physically separate from each other to facilitate them being placed either side of the subsystem unit; in this case, the support structure serves to hold the side mounting members in position against the unit when the latter is inserted in the support structure. Alternatively, the side mounting members can be interconnected by a flexible member permitting the side mounting members to be flexed out of a normal oppositely-facing configuration for engagement about the subsystem unit; interconnecting the side members facilitates their storage in the support structure prior to a unit being installed.

Preferably, each side mounting member comprises a wall element and at least one mounting element in the form of a generally U-shaped resilient metal member with two interconnected side arms that embrace the wall element, one arm of the mounting element being provided with a projection serving as a said stud of the side mounting member and the other arm being provided with an outwardly-projecting resilient contact providing an electrical grounding connection to the support structure.

Advantageously, the side mounting members are formed with resilient snap-engagement means for snap engaging the support structure to hold the subsystem unit in its fully inserted position, the snap-enagement means being manually releasable to enable a user to remove the unit. Furthermore, in order to facilitate the plugging and unplugging of an electrical connector with the unit, the snap-engagement means preferably also snap engage with the support structure at a partially-inserted position of the subsystem unit.

In one preferred embodiment, the side mounting members are arranged to accommodate two units disposed one above the other in spaced relation.

According to another aspect of the present invention, there is provided a mounting element for use in mounting a subsystem unit on a support structure through the intermediary of side mounting members, said subsystem unit having side fixing holes; the mounting element comprising a generally U-shaped resilient metal member having two interconnected side arms for embracing a wall portion of a said side mounting member, one said arm being provided with an outwardly-projecting stud for engagement in a said side fixing hole of the subsystem unit and the other said arm being provided with an outwardly-projecting resilient contact for providing an electrical grounding connection to said support structure.

BRIEF DESCRIPTION OF THE DRAWINGS

A mounting arrangement embodying the invention will now be described, by way of non-limiting example, with reference to the accompanying diagrammatic drawings, in which.

BEST MODE OF CARRYING OUT THE INVENTION

Figure 2:
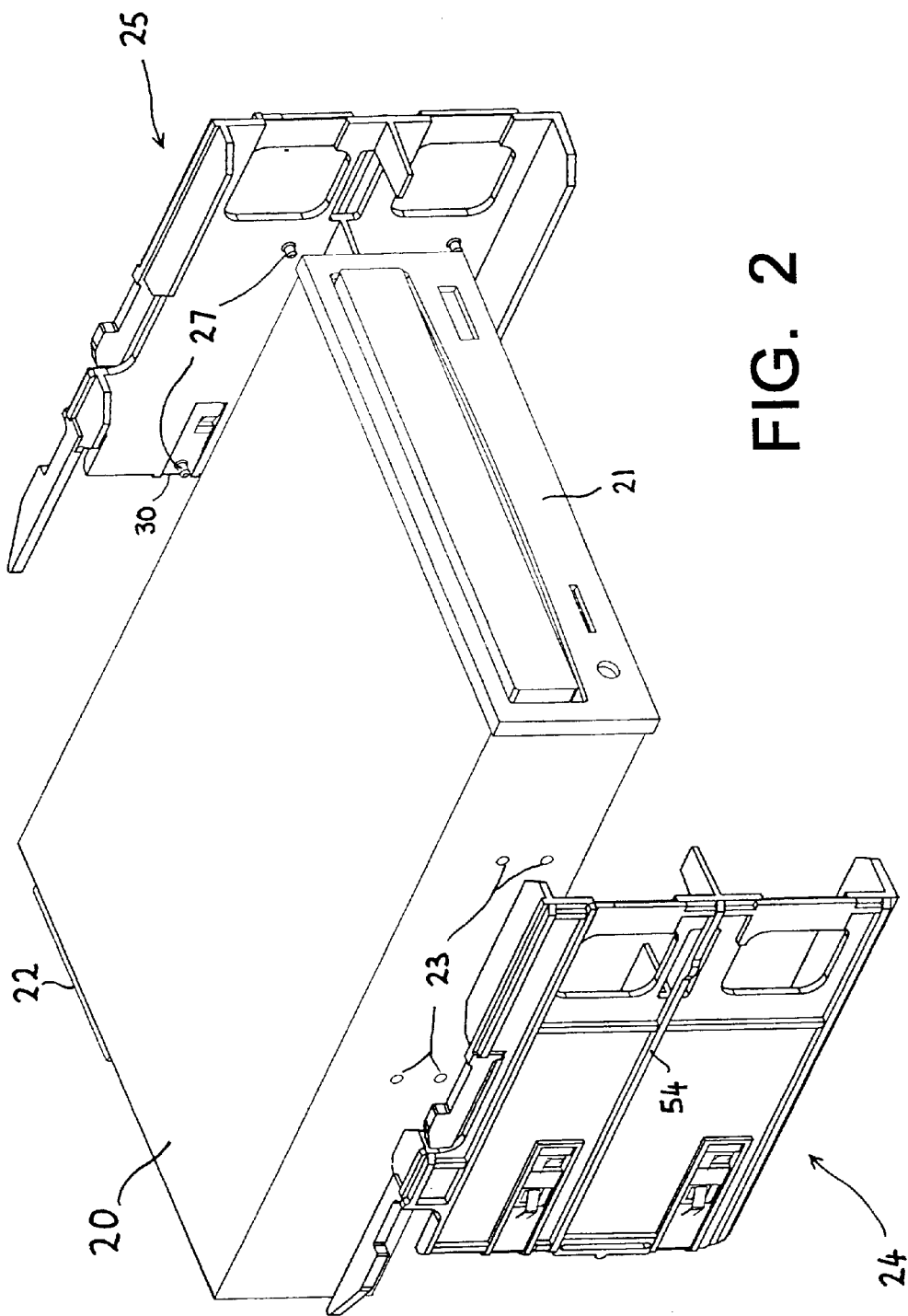
FIG. 2 is a perspective view showing a drive unit and two side members of a drive mounting arrangement embodying the present invention.

FIG. 2 shows the main components of the preferred embodiment of the present invention, here shown in relation to mounting a CD-ROM drive 20 having a front face 21, a rear electrical connector 22, and side fixing holes 23. In fact, the FIG. 2 mounting arrangement can mount two such drive units 20.

Figure 1:
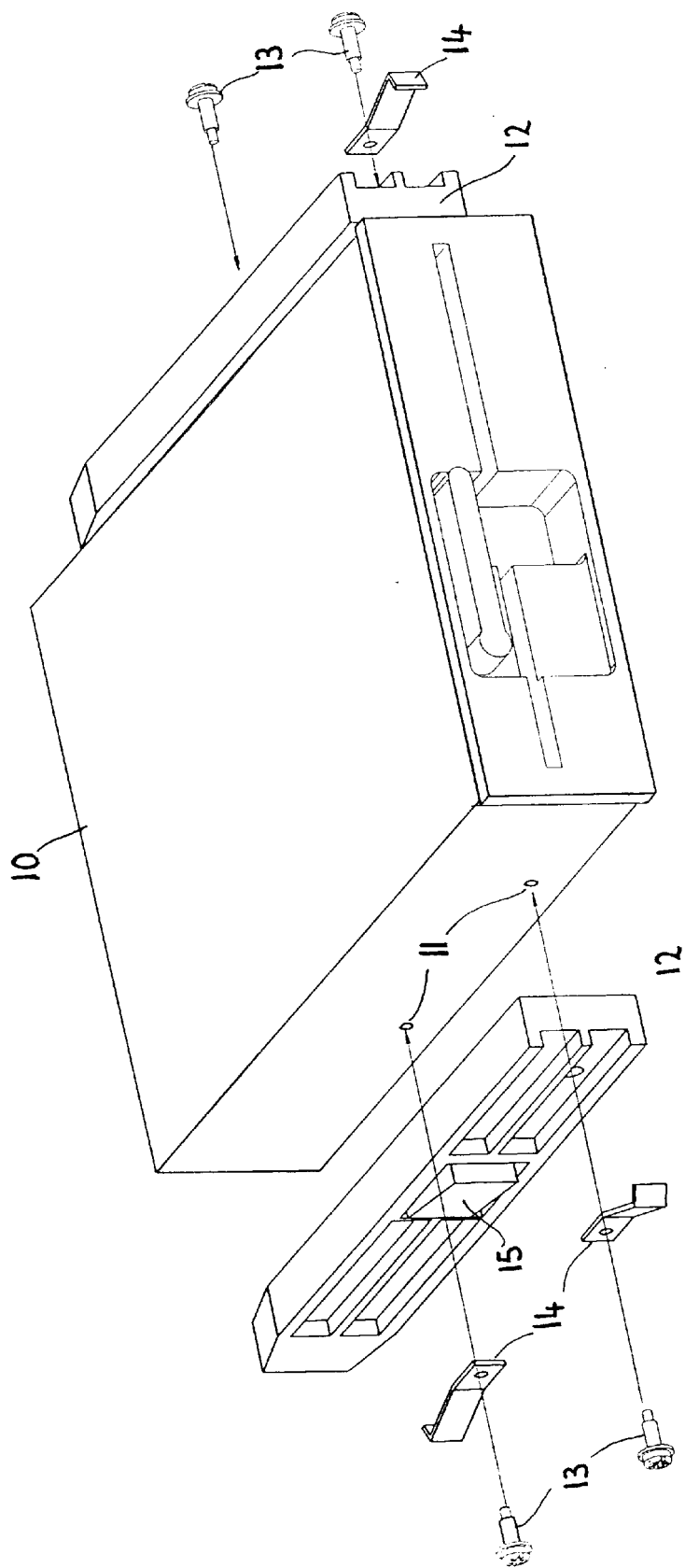
FIG. 1 is a perspective view of a known drive mounting arrangement using side members attached by fixing screws to a drive unit.

Like the FIG. 1 mounting arrangement, the FIG. 2 mounting arrangement involves the use of two side members 24 and 25 that engage the sides of the drive unit 20 and serve to facilitate the sliding insertion and location of the drive unit 20 in a support structure of a computer. However, unlike the FIG. 1 arrangement, the side members 24 and 25 are not screwed to the sides of the drive unit 20. Instead, studs 27 of the side members 24 and 25 are arranged to locate in the fixing holes 23 of the unit 20 but without screw engagement. Thus, the side members 24 and 25 must initially be engaged against the sides of the drive unit 20 and held there until the assembly formed by the unit 10 and members 24, 25 is inserted into the support structure; thereafter, the support structure (to be described below) serves to hold the side members against the drive unit preventing the studs 27 from coming out of the fixing holes 23.

Figure 3:
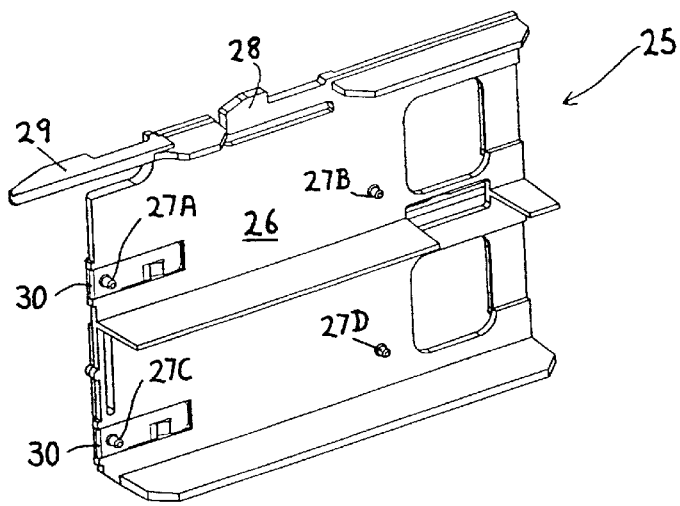
FIG. 3 is a perspective view of a side member of the FIG. 2 arrangement.
Figure 4:
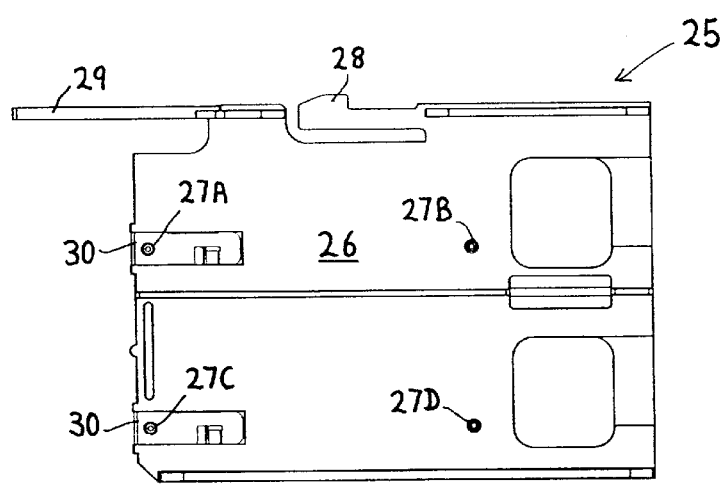
FIG. 4 is a full on view view of the FIG. 3 side member.
Figure 5:
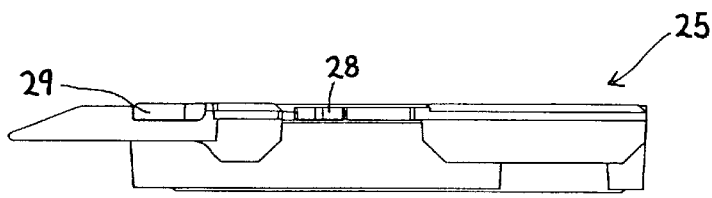
FIG. 5 is a top plan view of the FIG. 3 side member.

A more detailed description of the side members will now be given with reference to FIGS. 3 to 5 in relation to the side member 25. The side member 25 comprises a side wall element 26 formed from a plastics material and providing upper and lower drive bays for locating upper and lower drive units 20 one below the other. The upper drive bay has two associated locating studs 27A and 27B; similarly, the lower drive bay has two locating studs 27C and 27D. Along its top edge, the wall element 26 is formed with two resilient arms 28 and 29 providing respective snap-engagement mechanisms for cooperation with corresponding elements provided on the computer support structure.

The locating studs 27B and 27D are integrally formed with the wall elements 26. However, the locating studs 27A and 27C are provided by spring-metal mounting elements 30 engaged on the wall elements 26; the purpose of the mounting elements is to provide a grounding connection between the casing of a drive unit 20 and the computer support structure.

Figure 6:
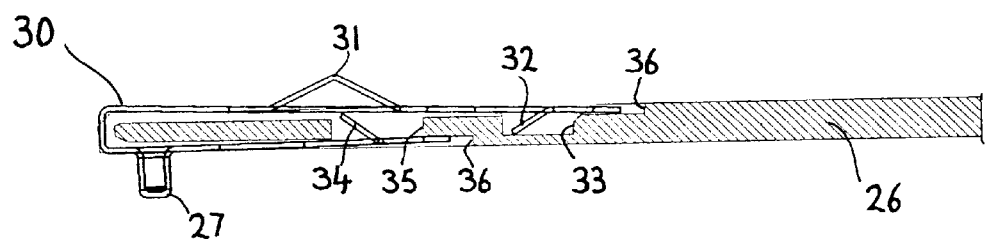
FIG. 6 is a cross-sectional view of part of the FIG. 3 side member illustrating the form of a metal mounting element of the side member.
Figure 7:
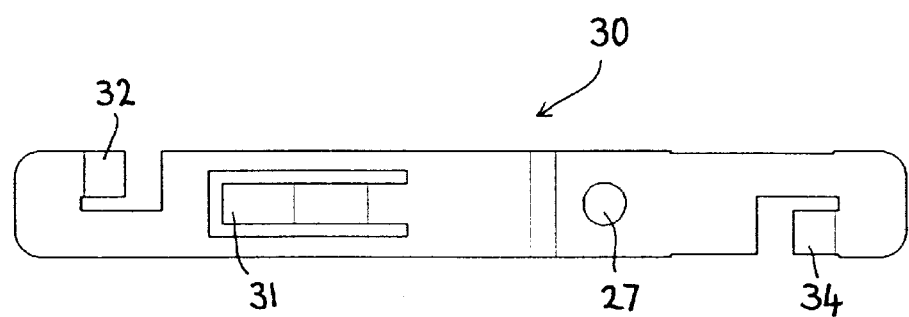
FIG. 7 shows a stamped metal part used to produce the FIG. 6 mounting element.

The form of each mounting element 30 can best be seen from FIGS. 6 and 7. FIG. 6 is a cross sectional view of part of the wall element 26 showing the shape of the mounting element 30 and how it is engaged with the wall element 26. As can be seen, the mounting element 30 is generally U-shaped in form with two arms that embrace the wall element 26. One arm is formed with a resilient contact 31 and an inwardly-directed projection 32 whilst the other arm is formed with a locating stud 27 and another inwardly-directed projection 34. The projection 32 engages in a recess 33 in the wall element 26 whereas the 34 engages in an aperture 35 in the element 26. Together the projections 32 and 34 serve to hold the mounting element 30 in position on the wall element 26. To aid initial location of the mounting element 30 and to seat the element flush with the main part of the wall element 26, the latter is formed with a depression 36 in the zone of engagement of the element 30. The mounting element 30 is made of spring metal enabling the wall element 26 readily to be pushed between the arms of the element 30 to locate the latter on the wall elements 26 in a position shown in FIG. 6.

FIG. 7 shows, in plan form, a stamped metal part ready for bending to form the mounting element 30.

When a drive unit 20 is mounted between the side members 24, 25 and inserted into the computer support structure, the mounting elements 30 provide a good electrical connection between the drive unit 20 and the support structure, this being achieved by means of the studs 27 locating in the drive unit side wall and the resilient contacts 31.

Figure 8:
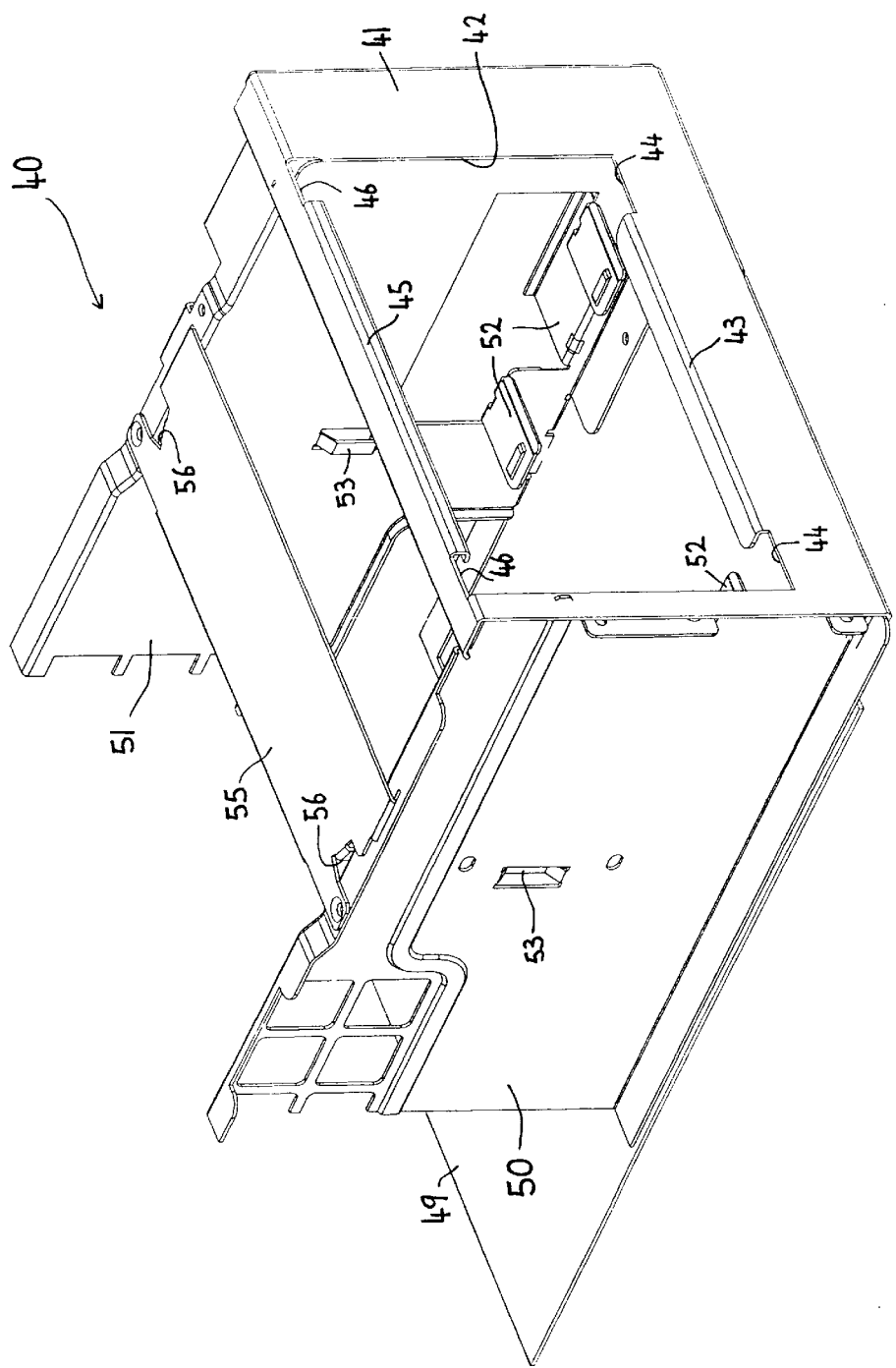
FIG. 8 is a perspective view of a support structure of a computer, teh support structure being configured to receive the assembly of components shown in FIG. 2.

FIG. 8 shows the part of a metal support structure of a desktop computer configured to receive the assembly of side members 24 and 25 placed around one or two drive units 20. The support structure comprises a base plate 49 integral with a front wall 41 and mounting side walls 50 and 51. A cross member 55 joins the tops of the side walls 50 and 51.

The front wall 41 is formed with a rectangular aperture 42 for receiving the assembly of the side members 24, 25 and drive unit(s) 20. The part of the wall 41 forming the lower edge 43 of the aperture 42 is formed with guiding recesses 44 for receiving the bottom edges of the side members 24 and 25. Similarly, the upper cross element 46 of the front wall 41 is formed with recesses 46 for receiving and guiding the tops of the side members 24 and 25.

The side walls 50 and 51 are provided with ledges 52 intended to support the bottom of the side members 24 and 25 and to guide the insertion of the members into the space defined between the walls 50 and 51. In addition, pressed-out elements 53 are designed to engage mid-height external ribs 54 (see FIG. 2) of the side member 24 and 25 to ensure that these members remain up against the disc drive or drives 20.

Downwardly projecting members 56 pressed out from the cross member 55 serve as stop elements behind which the resilient arms 29 of the side members snap engage when the side members are fully inserted into the support structure. The rear edge of the cross element 45 of the support structure performs a similar function for the resilient arms 28 when the side members are in a partially inserted position.

Figure 9:
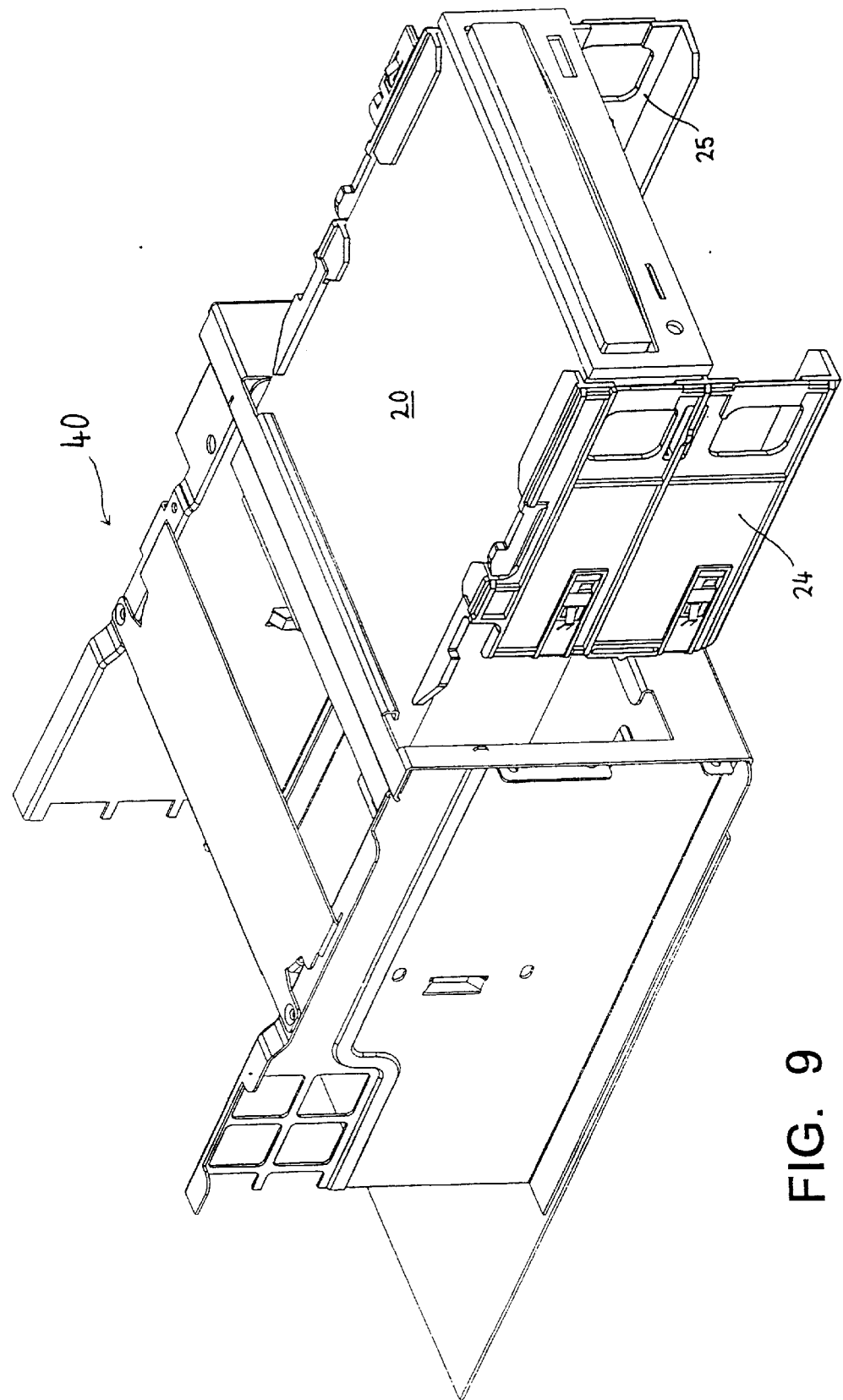
FIG. 9 is a perspective view similar to FIG. 8 but showing the assembly of FIG. 2 components about to be introduced into the support structure.
Figure 10:
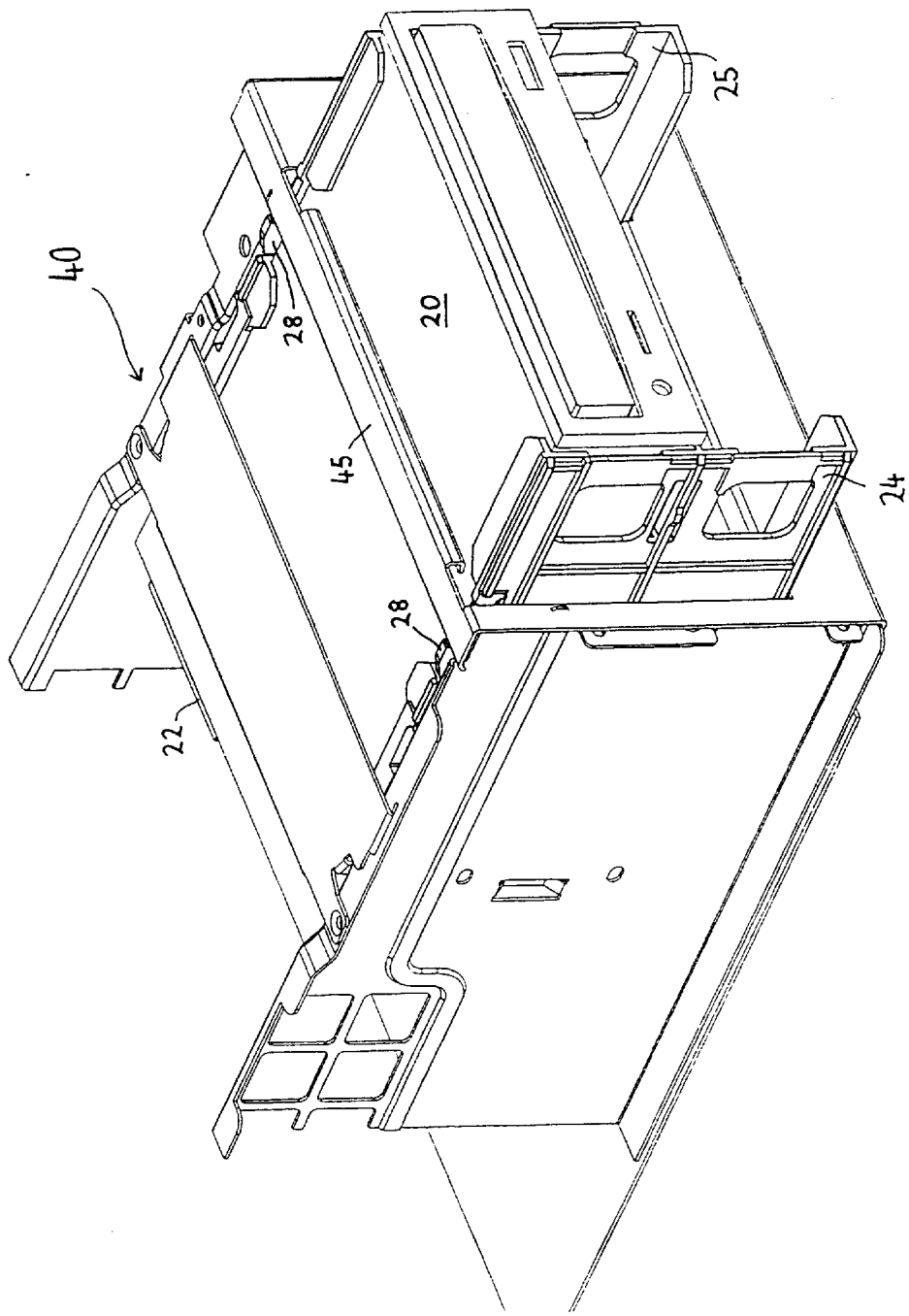
FIG. 10 is a perspective view similar to FIG. 9 but showing the assembly of FIG. 2 components in a partially inserted position.
Figure 11:
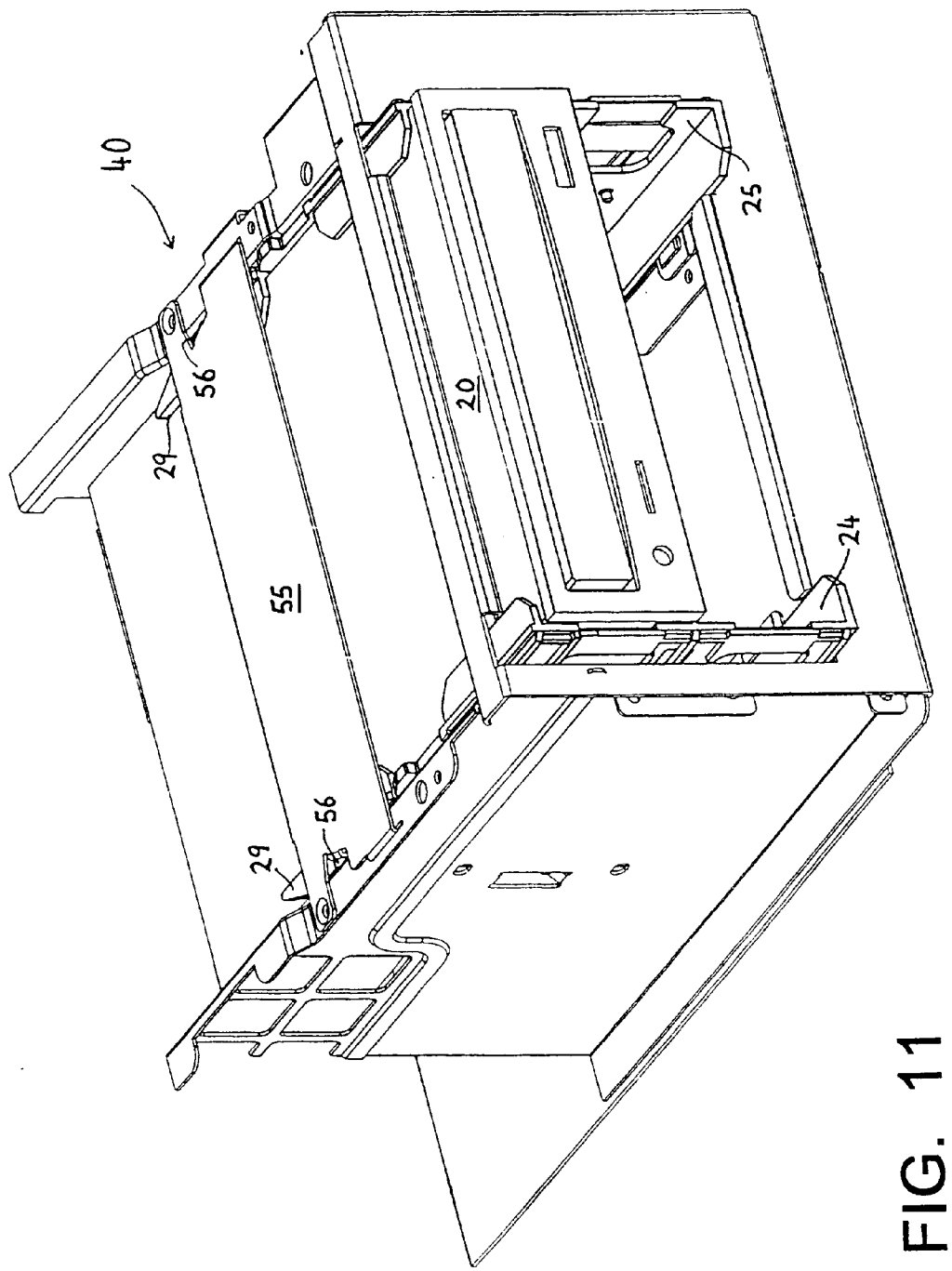
FIG. 11 is a perspective view similar to FIG. 9 but showing the assembly of FIG. 2 components in a fully inserted position.

FIGS. 9, 10 and 11 show progressive stages of insertion of an assembly of the FIG. 2 components into the support structure 40 through aperture 42. More particularly, FIG. 9 shows the assembly of components 20, 24 and 25 at the start of the insertion process; at this stage the side members 24 and 25 must be held against the sides of the drive unit 20 by a user. FIG. 10 shows the assembly of components 20, 24 and 25 in a partially inserted position in which the snap-engagement arms 28 have just snapped engaged behind the cross element 45; in this position, a user need no longer hold the side members 24 and 25 against the unit 20. Furthermore, with the component assembly in the partially inserted position there is sufficient space behind the rear of the drive 20 to enable an electrical connector to be engaged with the connector 22 on the rear of the unit 20 (such engagement may be very difficult when the unit 20 is fully inserted as space is normally at a premium within a desktop computer). If a user wishes to remove the component assembly 20, 24 and 25 from the support structure 40 when the component assembly is in its partially inserted position, then the arms 28 can be readily released from the snap-engaged position by downward finger pressure on the arm.

FIG. 11 shows the component assembly 20, 24 and 25 fully inserted in the support structure 40 with the snap-engagement arms 29 snap engaged behind the stop elements 56. To withdraw the component assembly from the support structure, a user must release the snap-engagement mechanism by using finger pressure to move the arms 29 inward towards each other.

Figure 12:
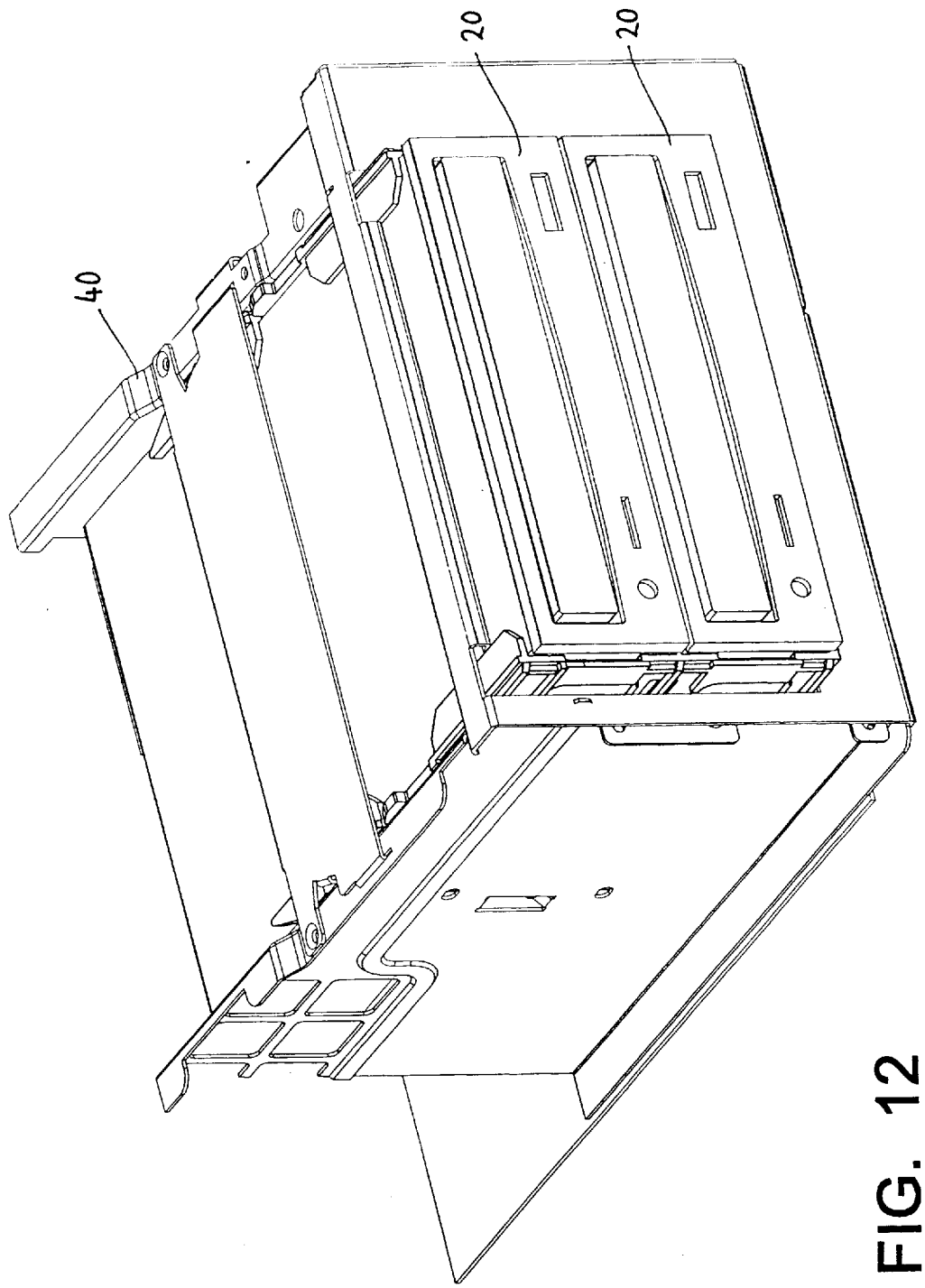
FIG. 12 is a perspective view similar to FIG. 11 but with two drive units mounted in the mounting arrangement.

FIG. 12 shows two drive units 20 held in position between the side members 24 and 25 and inserted in the support structure 40.

It will be appreciated that the drive mounting arrangement described above with reference to FIGS. 2 to 12 provides for simple installation by a user of a new drive unit or units. In particular, all a user need do is to place a new drive unit between the side members 24 and 25, hold these members in position whilst the assembly is introduced into the support structure, and then slide the assembly into a fully inserted position. There is no need for a user to employ any tool. Replacement of an existing drive unit by a new one is equally easy.

Figure 13:
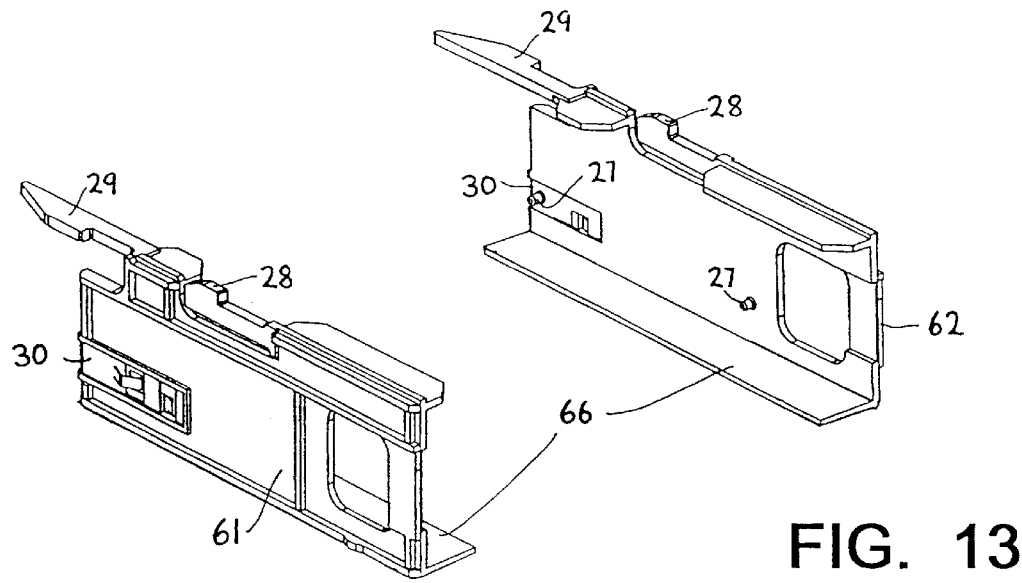
FIG. 13 is a perspective view of two side members of a second drive mounting arrangement embodying the invention.

Many variants are, of course, possible to the described embodiment of the invention. Thus, for example, the side members can be designed to mount only one drive unit and FIG. 13 illustrates side members 61 and 62 suitable for this purpose. Like the side members 24 and 25, the side members 61 and 62 are each provided with locating studs 27, snap-engagement arms 28 and 29, and a metal mounting element 30 (providing one of the studs 27).

Figure 14:
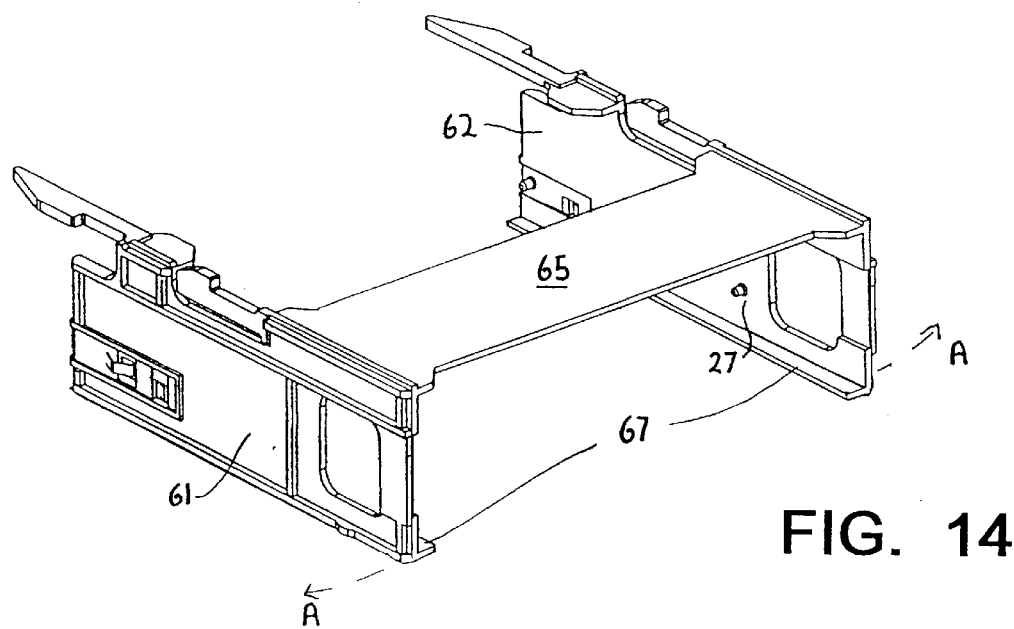
FIG. 14 is a perspective view showing joined side members of a third drive mounting arrangement of the invention.

FIG. 14 shows a variant of the FIG. 13 arrangement in which the side members 61 and 62 are joined by a flexible bridge element 65. The flexibility of the bridge element 65 is such that the side members 61 and 62 can be flexed apart as indicated by arrow A to permit a drive unit 20 to be placed between them. Upon the side members 61 and 62 resuming their normal oppositely-facing positions, the studs 27 of the members 61, 62 engage in the fixing holes in the side of the drive unit. To facilitate the process of inserting a drive unit between the side members 61, 62, flange elements 67 provided along the bottom of the FIG. 14 side members 61, 62 are made narrower than the corresponding elements 66 of the FIG. 13 side members.

Whilst the FIG. 14 arrangement makes initial engagement of the side members with the drive unit a little more cumbersome than for the FIG. 13 arrangement, it has the advantage that the user does not need to hold the side members 61 and 62 up against the drive unit prior to insertion of the assembly into the support structure. A further advantage is that the side members 61 and 62 can be stored in position in the support structure without a drive unit 20 positioned between them.

The mounting arrangements illustrated in FIGS. 2 to 14 can be dimensioned for mounting any size of mass-storage drive unit. Where the mounting arrangements are dimensioned to mount 5"25 drive units, any suitable adaptor can be used to enable 3"5 drive units also to be mounted. Furthermore, although the mounting arrangements illustrated in FIGS. 2 to 14 have been described as intended for mounting a mass-storage drive unit, it will be understood that the mounting arrangements could also be used to mount other types of subsystem unit. For example, the mounted subsystem unit could be a small printer.

We claim:

1. A screwless mounting arrangement for mounting a subsystem unit provided with side fixing holes, said mounting arrangement comprising:

two side mounting members for engaging respective opposite sides of said subsystem unit prior to insertion thereof into a support structure, each side mounting member having studs that engage in corresponding ones of said side fixing holes when the side mounting members are placed in engagement with the subsystem unit, a support structure provided with guide means engaged by said side mounting members for guiding the insertion and withdrawal of the subsystem unit with the side mounting members engaged and moving therewith, wherein each said side mounting member comprises a nonconductive wall element and at least one generally U-shaped resilient metal member mounted on said wall element at a distal end thereof that is initially inserted into said support structure and having two interconnected side arms for grasping said wall element, one said arm of said metal member provided with a projection serving as one said stud of the side mounting member and the other said arm provided with an outwardly-projecting resilient contact providing an electrical grounding connection to said support structure.

2. A mounting arrangement according to claim 1, wherein said guide means guide insertion and withdrawal of said subsystem unit along a front-to-rear axis of the subsystem unit.

3. A mounting arrangement according to claim 1, wherein said side mounting members are physically separate from each other, said support structure serving to hold said side mounting members in position against the subsystem unit when the latter is inserted in the support structure.

4. A mounting arrangement according to claim 1, wherein said side mounting members are interconnected by a flexible member permitting the side mounting members to be flexed out of a normal oppositely-facing configuration for engagement about the subsystem unit.

5. A screwless mounting arrangement according to claim 1, wherein the wall elements are of plastic material.

6. A screwless mounting arrangement according to claim 5, wherein each said wall element is formed with at least one recess in the region of each said metal member and each metal member is formed with at least one inwardly-directed projection snap engaged in a corresponding said recess.

7. A mounting arrangement according to claim 1, wherein said side mounting members are formed with resilient snap-engagement means for snap engaging said support structure to hold the subsystem unit in its fully inserted position, said snap-enagement means being manually releasable.

8. A mounting arrangement according to claim 7, wherein said snap engagement means are further snap engagable with said support structure at a partially-inserted position of said subsystem unit whereby to facilitate connection/disconnection of an external electrical connector.

9. A mounting arrangement according to claim 1, wherein said side mounting members are formed with studs to engage two subsystem units disposed one above the other in spaced relation.

10. A computer including a mounting arrangement according to claim 1 mounting a subsystem unit constituted by a mass-storage drive unit.

* * * * *